Nov. 30, 1954 P. GRAHAM 2,695,716
VEHICLE PARKING DEVICE
Filed Sept. 26, 1951 3 Sheets-Sheet 1

Inventor
Phillip Graham
By William J. Ruano
Attorney

Nov. 30, 1954 — P. GRAHAM — 2,695,716

VEHICLE PARKING DEVICE

Filed Sept. 26, 1951 — 3 Sheets-Sheet 2

INVENTOR.
Phillip Graham
BY
William J. Ruano
ATTORNEY

United States Patent Office 2,695,716
Patented Nov. 30, 1954

2,695,716

VEHICLE PARKING DEVICE

Phillip Graham, Pittsburgh, Pa.

Application September 26, 1951, Serial No. 248,416

12 Claims. (Cl. 214—16.1)

My invention relates to a vehicle parking device which can be readily used to raise and park vehicles above the ground level. My vehicle parking device is used, in general, to lift and park vehicles in what would otherwise be unused space. This allows the economical parking of vehicles high enough above a floor surface, or the surface of a parking lot, to free the space below to be used also, either for parking or for other purposes. It is a relatively low-cost parking device since its operation requires no power, in general, except the motive power of the vehicles being parked on it. The use of this vehicle parking device would insure higher rentals in parking areas, since the capacity of a lot could be multiplied, in most cases, tripled or more. It would make available parking space on sites that otherwise would be neither economical nor physically possible to use for parking. Indirectly, the parking device would maintain real estate and other business values by providing more parking space at low cost in congested areas inasmuch as values decline as the potential business from the car driving public is taken to less congested towns or suburban areas.

My parking device would fill the need for increased parking facilities where it would be impractical to build costly parking garages. No ramps or elevators are required to raise vehicles into a tiered parking space. Only a small amount of space is required for driveways, therefore a large number of cars can be stored in a relatively small space.

My vehicle parking device (including the modifications) can be set up temporarily or permanently in or on available surfaces, such as parking lots, floor surfaces, roof surfaces, above driveways, streets, and walkways. Such parking devices can be cantilevered out from buildings, hillsides, and shorelines. In this manner otherwise unproductive space could be used for parking.

A modified form of my parking device is portable. It can be set up or dismantled at relatively low cost. This would provide parking facilities where the demand is seasonal or of short duration. It can be used to park cars high above the ground, when the parking space is between the sidewalk and street. Thus this space could be used for parking and yet the visibility at the surface level would not be obstructed for pedestrians or people in passing vehicles. When cars are parked high in these devices, vandalism is discouraged since the cars are not easily accessible and can be more readily seen by passersby. Since it raises cars high above the ground level my parking device would protect them from tidal or fresh water floods.

Some potential parking lots have too small a capacity to warrant employing an attendant to operate them. By multiplying the capacity of such small lots with the use of the present parking devices, it would be practical to employ an attendant, making the site profitable as a parking lot.

In some hilly sections, not enough level space can be found to accommodate the would-be parking patrons. My parking device could be used here to park cars where little space is available, cantilevering the cars out into space to a certain extent. My parking device can be mounted on roof areas, where head room is no problem. The load bearing on the wall of the building would often be taken without much strengthening of members in the wall structure. With part of this device cantilevering over the side of the building, considerable parking space would be gained.

My parking device can also be used to ramp vehicles from the ground surface to the second or third floors of a building. In that case, the device would be used both as a ramp and as a parking unit.

New and used car sales lots and showrooms can employ my parking device to park and display cars in tiers. Thus many more vehicles could be displayed along a valuable frontage. Large automobile repair shops can use the parking device to park cars inside in cold weather. Thus the cars would be warm and free of snow and ice when the mechanic is ready to work on them.

My parking device can be set up in areas where little space is available for parking, or when the ground or floor surface must be used for streets, driveways, walkways or for manufacturing purposes. The supports for the parking device take up such a small amount of room that it is not objectionable, in most cases. This parking device can be quickly erected and dismantled in parking lots without materially disturbing the surface. In fact, no anchorage whatever is required on one modification of the parking device, that is, the portable device. Anchor bolts, in small concrete footers on the floor, anchor the device on most installations.

This vehicle parking device is similar in principle to a double-decker seesaw with vehicles spaced on it as children would be on the seesaw. They are usually set up in pairs to help load one another. There are modifications such as a single seesaw, or runway, similar in principle to a child's seesaw.

The double-decker, or parking device with two tiers of runways, will be described in general. A runway has a track on which to park. It has two rails for engaging the vehicle wheels. The tilting runways are pin-connected to a fulcrum structure, which is similar in principle to a saw-horse in a child's seesaw, or to other supports such as building columns and walls which act as a fulcrum member. The top and bottom runways are linked together, and therefore act together when tilting. The bottom runway, when in horizontal position, is high enough off the ground to clear two vehicles parked in the space below. The fulcrum is generally made of two A frames connected to the tilting runways with pins. The runways rock or pivot on these pins. The runways act both as ramps and parking surfaces.

In general, the parking device comprises a pair or series of similar units. The upper tier is loaded with the help of the adjacent unit, which is used to ramp vehicles to the top runway. A unit could be used singly, but it would usually require driveways at two levels for access. The runways on the parking device are usually kept in horizontal position when the unit is not being used, and the clear space below is then available without interference from these runways. The runways are perfectly balanced so that an end can be easily pulled down, thus allowing one end of the lower runway to touch the ground. Since all the runways are linked together, they work simultaneously.

A system of locks holds the runways in various positions. A master control system is hooked up to all safety devices and locks to control the movement of the runways. The master control cables, with feeders, can be reached while the operator is in any nearby location to operate the parking device, that is, from any vehicle parked thereon, or from the ground level. A delay-action mechanism leaves the safety devices and the latches open for short periods while the runways are being tilted to a required position.

In general, the parking device is tilted and loaded. This seesawy, pivoting or tilting movement, is controlled by shifting the moments of the runways about the fulcrum pins. This is done by parking the vehicles on the runways outwardly enough so as to create the desire maximum moment to cause tilting action. Moving these vehicles to positions where they unbalance the runways causes moment changes and the runways will tilt about the fulcrum pin. This action tilts up the ends of the runways, which have a lesser moment about the fulcrum pins. The moment is a force tending to rotate a load about a given point, in this case, the fulcrum pin. The moment equals the weight or force times the distance from the fulcrum pin. An object of my invention is to store a large number of vehicles in a relatively small space by means which can be readily assembled or transported. Other objects and advantages of my invention will become apparent from a study of the following specification taken with the accompanying drawings wherein:

Various figures on the drawings show two vehicle parking device units, L1 and L2, which act together as a pair; that is, they reciprocate in a manner to provide mutual assistance in loading their top runways. In general, this parking device shown has structural steel framing. It can be of welded, bolted or riveted construction, to suit its possible use. Other types of materials, such as aluminum, wood and concrete, can be substituted for some parts.

Parking devices L1 and L2 are alike, except for minor differences that are desirable under certain conditions which will be explained later. In general, at least two parking devices must be set up; they are placed end to end to act together in loading the upper runways. The parking devices or units are given different reference numbers for the purpose of illustration. Parking device or unit L1 has a lower runway R1 and an upper runway R2. Parking device or unit L2 has a lower runway R3 and an upper runway R4. In general, parking devices L1 and L2 are symmetrical about their centers; walkways and hydraulic cylinders constituting the main exceptions. All runways are similar. It is obvious then that many parts of the device are the same. In order to avoid congesting the illustrations, reference marks are not repeated for a part that is under a group reference marking or which is obvious.

Figure 1:
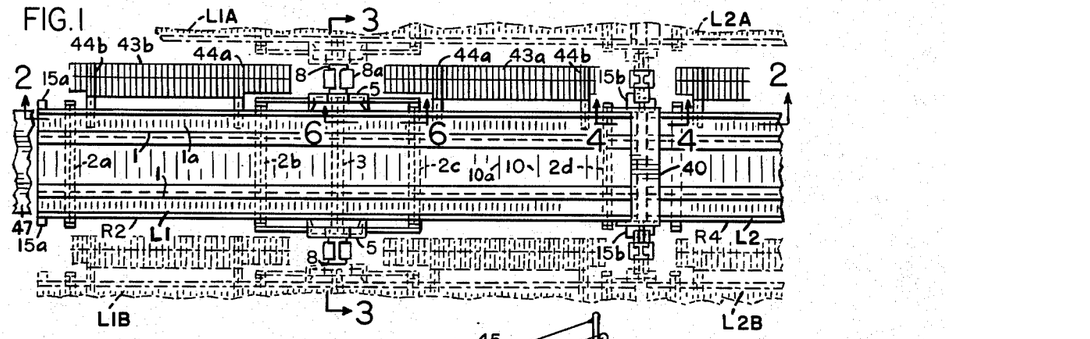
Fig. 1 is a plan view showing a vehicle parking device L1 embodying the principle of my invention and fragments of similar adjacent parking devices.
Figure 2:
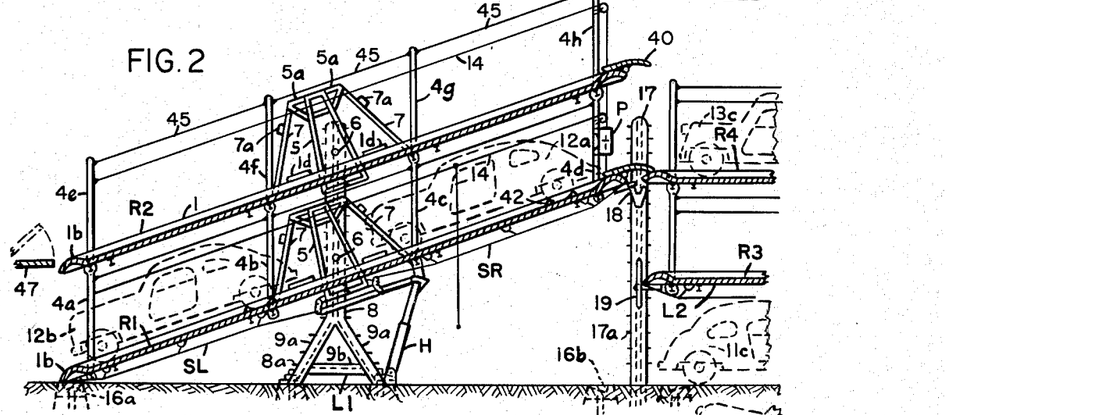
Fig. 2 is a fragmentary sectional elevation, taken along line 2—2 of Fig. 1, showing runways on parking device L1 in a tilted loading position.
Figure 3:
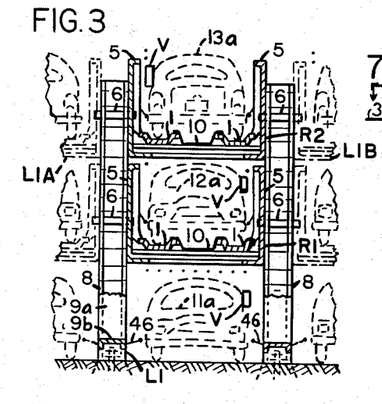
Fig. 3 is a fragmentary sectional elevation, taken along line 3—3 of Fig. 1.

In Fig. 1, runway R2 is shown forming the top member of the parking device L1. It consists of two rails 1 which are tracks for the wheels of the vehicles parked on, or ramped over, this runway. Rails 1 are bent plates, similar in shape to a shallow trough or structural steel channel. Cleats 1a are raised indentations on the webs of rails 1. These cleats offer traction for the vehicle tires, also they stiffen the webs of rails 1. Cleats 1a form a bearing surface to prevent angle wheel blocks 42 from sliding when under a load, as will be described later. Cleats 1a do not extend the full width of the webs of rails 1 so that parts of the webs that are flat will allow full drainage. The webs act as gutters to insure proper drainage of rain, snow and grease from the runways. Rails 1 are tied together by cross beams 2a, 2b, 2c, 2d, and 3. Beam 3 carries the load of the runway and of the vehicles parked thereon to the flanged center pin plates 5. Small pins are welded to the ends of beams 2a, 2b, 2c, and 2d, which engage connecting links and diagonals fastened thereon. Vertical link or post members 4a, 4b, 4c, and 4d tie runways R1 and R2 together as shown in Fig. 2, and support overhead hand rail or line 45 and control cable 14. Post members 4e, 4f, 4g, and 4h support an overhead hand rail 45 and control cable 14. If and when an additional tier or runway is added, as will be described in a later modification, post members 4e, 4f, 4g, and 4h would be fastened to the additional runway to form links between it and R2. These members 4a to 4h are pin-connected to the ends of cross beams 2a, 2b, 2c, and 2d. For the arrangement shown, post members 4e, 4f, 4g, and 4h in the top tier are keyed to the vertical link members 4a, 4b, 4c, and 4d below, so they act together. Members 4a and 4e, etc can be combined to form and act as one member.

A modification of the arrangement shown in Fig. 2 and Fig. 3 can have post members 4e, 4f, 4g, and 4a, in the top tier, fastened at the bottom and so rigged that they would remain perpendicular to the top runway. With this modification, these members would act as vertical truss members, with hand rail 45 acting as the top chord of the truss and rail 1 acting as the bottom chord of the truss. Additional vertical and diagonal members could be added to form a strong truss which would carry the top runway load. They would also help to carry the lower runway load since links 4a, 4b, 4c, and 4d would act as hangers.

Pin plates 5 transmit the load of the runway and of the vehicles on it to fulcrum pins 6. Pins 6 preferably have a washer and bolt at the end to restrain pin plates 5 from slipping off. These fulcrum pins 6 are located at the approximate center of gravity of a runway loaded with cars of average weight; that is, the center of any tilted or horizontal position assumed by a loaded runway. Diagonal members 7 brace the runway parts, and, with the aid of rails 1 and plates 5, they help to form a truss-like member. They are fastened to brackets 5a and beams 2b and 2c. Brackets 5a, projecting out from plate 5, help to form a passage space between members 5 and 7 for the operator. Fulcrum member 8, which supports fulcrum pin 6, is a structural steel, wide flange section. It has ladder rungs 8a to enable the operator to reach the runways. The lower part of the fulcrum has an A frame shape, formed by structural channels 9a and 9b. The bottom ends of channels 9a are bent. Holes are formed in these bent ends to take anchor bolts which are imbedded in a concrete foundation. In modifications, building columns or hangers act as fulcrum members. Vehicles can be driven beneath the lower runway between fulcrum A frames. The pair of A frame fulcrum members use little space. Generally, they would use the space normally used by the parking lot operator as a walkway or access space between parked cars.

As shown in Figs. 1 and 3, runway center pieces 10 act as a walkway, drip-pan, or a roof for protecting the car below. They also act as a safety guard to prevent men or cars from falling through the runway, or as a third rail to support a vehicle wheel, such as a rear airplane wheel or the front wheel of a motor tricycle. Cleats 10a on center pieces 10 are similar to cleats 1a, on rails 1.

Vehicles shown in the various figures are situated as they would be if backed into position from the ground. This is the normal procedure in many parking lots, as it is considered safer to back cars into place, so they can be driven out into congested areas, front first. When a vehicle is backed onto the runway, the hump 1b, in each end of rails 1, raises the back wheels of the vehicle enough to allow the long over-hanging rear portion of the vehicle, especially the bumper, to clear the runway. This hump 1b also acts, to a certain extent, as a stop to prevent vehicles from accidentally rolling off the runways.

Figures 4, 5, 7, 8, 9, 10:
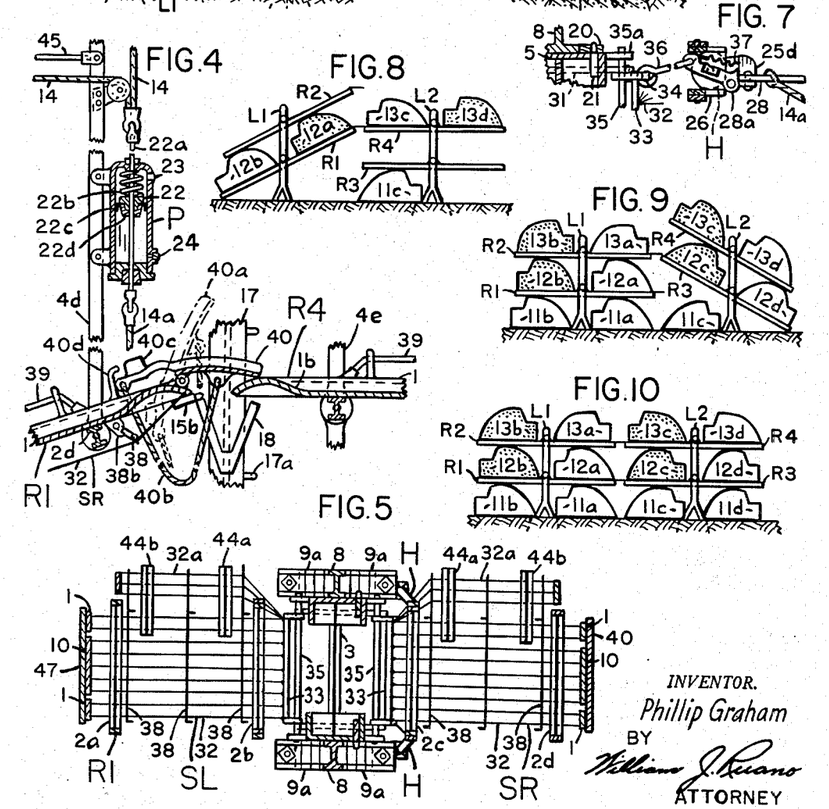
Fig. 4 is a fragmentary sectional elevation, taken along line 4—4 of Fig. 1.
Fig. 5 is a sectional plan view, taken along line 5—5 of Fig. 2A.
Fig. 7 is a fragmentary sectional plan view, taken along line 7—7 of Fig. 6.
Fig. 8 is a schematic diagram, showing an elevation of parking devices L1 and L2 in the same position as shown in Fig. 2 and showing one position in the loading sequence.
Fig. 9 is a schematic diagram, showing an elevation of parking devices L1 and L2 in a different position in the loading sequence.
Fig. 10 is a schematic diagram, showing an elevation of parking devices L1 and L2 with the parking space filled.

The vehicles shown shaded in loading sequence diagrams, Figs. 8, 9, and 10, are in such a position that they have greater moment arms than those shown unshaded. When the locking devices are released, the difference in moments exerted in opposite directions causes the rotation of the runways about the pins 6. These moment positions are changed to suit loading requirements, as can be seen in the sequence diagrams. Moments are changed, in some instances, by moving a car on a runway to a suitable position either toward or way from the fulcrum to change the moment arm. This shifts the greater moment from one end of the parking device to the other. The first tier of cars or other vehicles, 11a, 11b, 11c, and 11d, are parked on the ground or floor surface under runways on parking devices L1 and L2. The second tier of vehicles, 12a, 12b, 12c, and 12d, are parked on the lower runways R1 and R3. The third tier of vehicles 13a, 13b, 13c, and 13d are parked on the top runways R2 and R4. Sequences other than those shown in Figs. 2 to 10 inclusive are possible for parking the vehicles. Either end of the runways can be tilted to the ground.

If parking devices or units L1 and L2 were set up between two buildings, without space for entering the runways from the extreme ends, the vehicles could be loaded on the runways from the center, between the fulcrums of parking devices L1 and L2. With that sequence, it would be necessary to load the vehicles on a lower runway, and then reverse the tilt on that runway to allow the vehicles to be moved to the top runway of the other unit. Combined, unloaded runways are balanced so that they can be pulled down from the horizontal position with little effort.

A movable weight may be mounted on a runway to allow an empty runway to be tilted by powered movement of the weight. A continuous cable, rigged on pulleys the length of a runway, could be attached to the weight. One pulley could be driven by a reversible motor, to move the weight from the center of the runway to either end, to unbalance the runways, thus causing a tilting movement.

The sequence, shown in Figs. 8, 9, and 10, for loading the parking devices L1 and L2 is as follows: Assuming that runways for parking devices or units L1 and L2 are already positioned as shown in Fig. 2 and Fig. 8. Vehicle 11c is backed under runway R3. Vehicle 13d is backed up runway R1 to an extreme position, remote from the fulcrum on runway R4, so as to create a great moment. Next, vehicle 13c is backed up runway R1 onto runway R4. It is located closer to the fulcrum than was vehicle 13d, so that it will create a lesser moment than was created by vehicle 13d. Vehicle 12a is ramped up runway R1 to an extreme end position, to create a great moment. Then vehicle 12b is backed up to a position close to the fulcrum, creating a lesser moment. Locking devices, which will be explained in detail later, keep unequal moments from tilting the runways while the vehicles are being loaded. These locking devices hold until the operator releases them by pulling control cable 14, which is shown above the runways. This control cable 14 has feeders which can be reached from any car on the runways and from the ground. A delayed action, pneumatic cylinder P keeps the locking devices open for a short period to allow the tilting movement to begin, as will be explained more fully hereinafter.

Figure 2A:
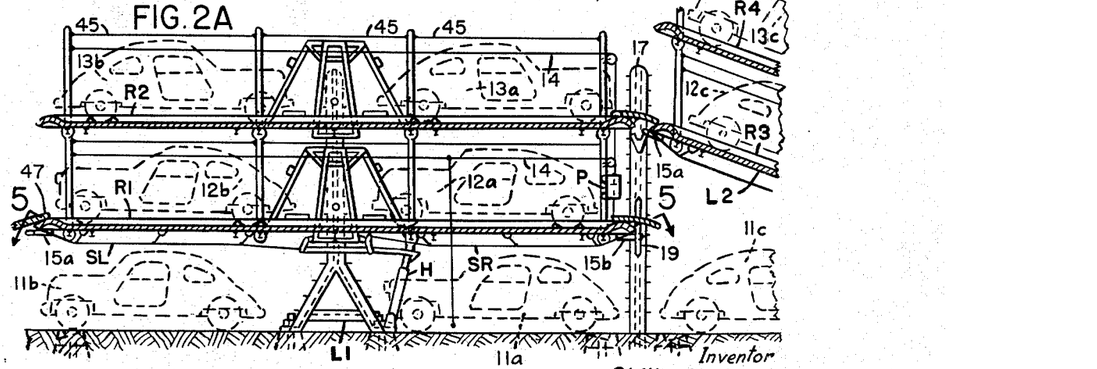
Fig. 2A is a view similar to Fig. 2, that is, taken along line 2—2 of Fig. 1, but showing the runways of parking device L1 in a horizontal loading position.

Figs. 2A and 9 show the position of the runways after the operator has pulled the control cables 14 on parking devices L1 and L2, allowing the moments to cause the rotation of the runways. These operations would not be simultaneous, since the runways on parking device L2 would have been tilted before parking device L1 was loaded. As shown in Figs. 2A and 9, vehicles 11a and 11b can be backed into position on the ground below runway R1. Then vehicle 13b is ramped up runway R3 to the extreme end position on runway R2, creating a great moment. Vehicle 13a is then ramped up runway R3 onto runway R2 to a position close to the fulcrum pin 6, thus creating a lesser moment. Next, vehicle 12c is ramped up runway R3 to the extreme end, to create a great moment, and vehicle 12d is ramped onto runway R3 to a position which will create a lesser moment than vehicle 12c. Then the operator pulls control cable 14 on runway L2, thus unlocking the runways to allow rotation to a horizontal position. Runways are designed to have a slight tilt at so-called horizontal position to provide for drainage to the desired end of the parking device.

Fig. 10 shows both parking devices L1 and L2 and the ground surface filled, after vehicle 11d has been backed under runway R3. The removal of the vehicles is the reversal of a loading sequence.

Vehicles that are not self-powered, such as trailers and disabled automobiles, can be ramped and parked on the present parking devices. They could be towed or pushed onto runways, or pulled with a cable and a winch. The dangers that might result from carelessness in operating this parking device are offset, to a large extent, by safety devices incorporated into it. Some of these devices could be omitted to suit the conditions where the parking device is used. Less safety devices would be required with skilled parking attendants than with the ordinary public. Micro-switches could be attached on a catch or latch at plate 5 to operate an indicator, such as two lights which would indicate which end of the parking device has the greater moment.

Hydraulic cylinders H, which are connected to the fulcrum A frame base and to the ends of beam 2c, are also operated from control cable 14. These cylinders H allow a bleeding action, which slows down the tilting movement of the runways. The bleeding action can be stopped to prevent the tilting of the runways. The safety screens SR and SL, below the runway, prevent the accidental lowering of the runway onto a vehicle or person on the ground level, below the end being tilted down. When screen SR or SL strikes an object below it, it automatically trips the locking mechanisms on hydraulic cylinders H, thus stopping the tilting movement.

Spring operated latches 15a and 15b are on the bottom runway, near the ends of rails 1. They engage catches 16a and 16b which are anchored to the ground surface or the floor by means of anchors imbedded in the concrete bases. Resilient pads or bumpers at 16a and 16b cushion the shock when the runway is stopped. A center post member 17, preferably a structural steel, wide flange section, is anchored and imbedded in concrete in the ground surface. It is used to support catches that engage and hold ends of the runways, thus preventing severe stresses from unequal loading. It can therefore act as an added safety device, or, by using rungs 17a, as a ladder for access to the ends of the runway.

Figure 6:
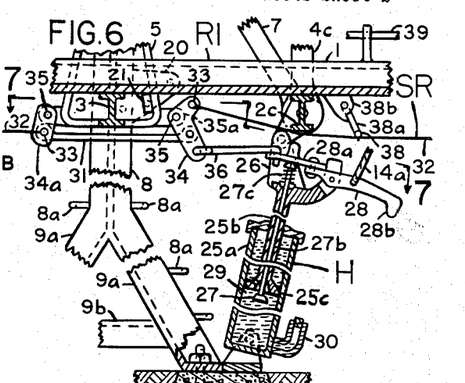
Fig. 6 is a fragmentary sectional elevation, taken along line 6—6 of Fig. 1.

In modifications, member 17 could be a building column, hanger, or wall. Bracket catches 18, near the top of post 17, engage latches 15a on runway R3 and 15b on runway R1 when the runway that the latch is fastened to is in the tilted position. Catch plate 19, near bottom of post 17, engages latches 15a on runway R3 and 15b on runway R1 when the runway that the latch is fastened to is in the horizontal position. Latches 15a and 15b are placed out from the ends of rails 1 at different distances, so their bolts will clear each other when engaging the catch openings in plate 19. All latches may be mounted on a resilient sliding support in which the spring would take up the shock. A catch plate 20, attached to fulcrum member 8 near runway R1, is shown in Fig. 6. It engages a spring operated latch 21 on center pin plate 5 of runway R1.

The control cables 14 are anchored to members 4a and 4e. Fig. 4 shows the arrangement at delayed action pneumatic cylinder P. Cables 14 are supported by pulleys on members 4d and 4h. Pneumatic cylinder P is supported on post 4d.

When an operator pulls cable 14 from the seat of any vehicle on the runways of a parking device, the piston rod 22a, and the piston 22 attached to it, are moved up in cylinder P. Cables 14 are attached to one end of piston rod 22a, and cable 14a is attached to the other end. Cable 14a and its feeders go to the latches and hydraulic cylinders H. A return spring 22b tends to force piston 22 down. A washer 22c prevents air leakage when the piston is forced down. Retainer 22d holds washer 22c against the piston. A retainer to prevent air leakage is located in the removable bottom of pneumatic cylinder P. When cable 14 is pulled or jerked, raising the piston 22, washer 22c allows air to pass it to fill the lower part of the cylinder. If desirable a check valve may be inserted near the bottom of the cylinder to allow air to enter, rather than to have air pass washer 22c. When the pull on cable 14 is released, spring 22b forces piston 22 down, and the air in the lower part of cylinder is compressed by piston 22. The increased air pressure partially counteracts the force of the spring 22b and the adjustable valve 24 allows a small stream of air to bleed out of lower part of cylinder. This bleeding lowers the air pressure and allows the spring 22b to push piston 22 down. Cylinder opening 23 allows air to flow freely out of the upper part of the cylinder. The slow bleeding action through the valve 24 delays the releasing of the latches 15a, 15b, 21, and the closing of the valves in cylinders H. When piston 22 has traveled part of its stroke, the pull on latches 15a, 15b, and 21 is released and they latch into the catch openings as soon as they reach them. The bleeding action of the hydraulic cylinders H is not stopped until piston 22 has traveled almost to the bottom of its stroke. Thus the latches are released before they reach the catches but, to stop the tilting movement of the runways and to lock them into position, the bleeding action of cylinders H must go on until the latches and catches engage.

When the runways of parking device L1 are tilted as shown in Fig. 2, the safety latching operates in the following manner: Latches 15a engage catches 16a at the ground surface and, in addition, catch plates 20 and latches 21 engage. In Fig. 2, runway R3 has latch 15a engaging catch plate 19, and latch 15b, on runway R1, engaging catch 18, both of which catch plates are on post 17. In Fig. 2A, latch 15b, on runway R1, engages catch plate 19, and latch 15a, on runway R3, engages catch 18.

When catches on posts 17 engage the runways, with the tilting arrangement shown in Figs. 2 and 2A, ground catches may be omitted without cutting the safety factor excessively. If conditions on the site make it impossible to use posts 17 and catches 16a and 16b, the catches 20 and latches 21 would do all the latching. Catches 20 and latches 21 would be highly stressed, if so used without end latches 15a and 15b. Additional posts 17 can be used at all ends of runways. No additional posts 17 are required when only the vehicle loading sequences, shown in Figs. 1 to 10 inclusive, are used, since only the outer end of each parking device is tilting down.

When ground catches are incorporated into a parking device arrangement, modified shortened posts 17 could be used to a limited degree to support catches 19 only, to catch and support the lower runways when they are in a horizontal position.

The two hydraulic cylinders H on parking device L1 are shown enlarged in Fig. 6. The end of parking device with the greatest moment forces the pistons down or up, since they are attached to runway R1. A cylinder H has a large cylinder 25a, which is pin-connected to pin plates, which are attached to the base of the fulcrum A frame. A small tube 25b is a piston rod, which has pin plates 26, which are pin-connected to pin plates on beam 2c. A sliding valve shaft 27b, in piston rod 25b, holds a conical shaped valve 27. When valve 27 is closed, it bears against a valve seat on piston 25c. Piston 25c is at the lower end of piston rod 25b. Valve spring 27c, near the top of piston rod 25b, tends to close valve 27 if it is not otherwise restrained. When cable 14a is pulled, through the action of control cable 14, it rocks lever 28 and the hinged tripper 28a. Hinged tripper 28a bears against a nut on the top end of valve shaft 27b. The rocking action of lever 28, with tripper 28a, forces valve shaft 27b down, thus opening valve 27 and allowing hydraulic fluid 29 to pass through the diagonal hole in piston 25c. This opening of the valve allows a slow bleeding action of fluid 29 from one end of cylinder 25a to the other. The bleeding action causes piston 25c to move slowly which restrains the runways from tilting at a rapid rate. To prevent too sudden a stoppage of the tilting movement which would strain the structure, a cushioning action is made. A small tube 30 is attached to the bottom of cylinder 25a. It forms an air pocket. The air in tube 30 is compressed by fluid 29 when valve 27 is closed and piston 25c is moving down, under a load. Compressing the air by pressure on the fluid 29 cushions the shock caused when the valve 27 is closed abruptly to stop the runway tilting movement. When a greater moment on other ends of the runways causes piston 25c to move up, a pocket of air in the top of cylinder 25a cushions the shock of a quick stop. Both cylinders H have cables 14a so rigged to them that they act together.

Details of safety screens SR and SL are shown in Figs. 4, 5, 6, and 7. The safety screens SR and SL are below the lower runway only. They have a means to trip and close the valves of cylinders H which stops the tilting movement on parking device L1 when an obstruction such as a car or person below runway R1 is touched by a screen. If conditions on the site are such that the runways are tilted to the ground for loading and unloading at one particular end only, the safety screen can be eliminated under the end of the runway that does not tilt to the ground. The pair of screens SR and SL act together with cylinders H. Screen SR consists of strands of wire 32 under the vehicle runway and wire 32a under the walkway. The wires are so rigged that they will contact any car or person below the downtilting end of the runway, except near center where the tilting does not materially cut head room. When the screen touches against an obstruction, or a strand of wire 32 or 32a is pulled by a person, the pressure against the wires created by the obstruction or pulling force pulls a linkage arrangement, which closes the valve valve 27 on cylinder H. Wires 32 and 32a are anchored to the end of the vehicle runway and walkway. The other end is fastened to a shaft 33 near the center of the runway. Shaft 33 on screen SR is supported by and keyed to levers 34. Shaft 33 on screen SL is supported by and keyed to links 34a. Shaft 35 on screen SR is the fulcrum for levers 34 which are keyed to it. Shaft 35 on screen SL has links 34a keyed to it. Shafts 35 are supported by pin plates 35a which are fastened to center plates 5. Link 31 connects lever 34 on screen SR to link 34a on screen SL. A link 36 connects tripper 28a and lever 34. Thus, when the pressure of an obstruction pulls any wire 32 or 32a, it causes lever 34 to rotate and pull link 36 which, in turn, pulls tripper 28a to trip valve 27 of cylinder H1.

Spring 37 connects the end of tripper 28a with an arm 25d which is attached to piston rod 25b. It tends to pull tripper 28a back to the nut on piston rod 27b when an obstruction under screen SR or screen SL is removed, or when link 36 is disconnected. Link 36, or some other linkage part, would have to be temporarily disconnected to allow the valves in cylinders H to be opened. Thus unlocked cylinders H would allow the runways to be tilted up from an obstruction which could not be moved until the moments on the runways were reversed. When the pull from screen is released, weight 28b on the end of lever 28 tends to tilt the short end of lever 28 up. After the tripping, a vertical lug on tripper 28a bears against the nut on valve shaft 27b. The lug allows tripper 28a to slide against the side of the nut to reach the top of the nut to the engaging position, thus setting the tripping arrangement. Wire 32 is held, or spaced, by its connections to cross members 38. These cross pieces 38 have two arms 38a. These arms have ends which are bent to form a pin connection to pin plates 38b which are fastened to the bottom of rails 1. A lug near the bottom of plate 38b prevents end arm 38a and member 38 from rotating down but allows it to rotate up if there is an obstruction below cross member 38. The weight of cross member 38 holds the wire strands 32 and 32a down to the place where they create a safety screen. Cross member 38 can revolve up when it hits an obstruction rather than to crush the obstruction or be broken. Cross members 38 are heavy enough to prevent them from being lifted by pressure or pull on the wire not directly under them. Therefore the wire can trip cylinders H. The wires 32 may bear against beam 2c as shown in Fig. 6. The runway tilts down so little near the center that safety is not a problem. Welded to the bottom of cross members 38 are U-shaped pieces, which restrain wires 32 and 32a from moving sideways. They guide wire strands 32a, which are under the walkways, allow them to change direction and connect to shaft 33. Thus screens SR and SL trip and shut off the safety hydraulic cylinders H when there is a pull, or an obstruction is engaged by any of these safety screen wires 32 or 32a.

Thus the frequent failures of the human element are compensated for. Screen SR is opposite hand, or the reverse of screen SL. Cylinders H, which are linked together, are under screen SL only.

If the depth of the rails 1 is not deemed sufficient to keep the cars from riding or climbing sides, cables 39 are used as additional safety curbs. (See Figs. 4 and 6.) Cables 39 are stretched from end to end of the runway above rails 1. They have intermediate supports extending to rails 1, and they are securely connected to diagonals 7 and center plates 5. Cables 39 are incorporated into the runway structure to act as tension members, in a trusslike structure. Thus the material required in rails 1 to carry a cantilevered load would be reduced.

Bridgings 40 are connected to runways R1 and R2 at the ends adjacent to parking device L2. As a result vehicles can be bridged from one runway to another on adjacent units. If an additional vehicle parking device, such as L1, is set up at the end of parking device L2, L2 would have bridgings 40 on its far end. Otherwise, it could be omitted. Bridging 40 is pin-connected to rails 1 (see Fig. 4). This bridging 40 meets variable conditions. It can engage the ground surface without preventing rails 1 on runway R1 from touching the ground. It has to engage the runways on the adjoining parking device at different positions. Bridging 40 assumes the position shown by dot-dash outline 40a when it is tilted manually or with motors that are manually controlled to pass runways on parking device L2 or to allow runways on parking device L2 to pass it. For instance, bridging 40 on runways R1 and R2 would have to be raised manually or with manual controlled motors, to allow runways on parking device L2, as shown in Fig. 9, to pass to a horizontal position, shown in Fig. 10. In another example, the runways on parking device L2 are horizontal and the runways on parking device L1 are to be tilted up from a low adjacent position. The bridging is tilted by pulling cable 40b, either manually or with a manual controlled motor. Counterweight 40c on the arm of bridging 40 helps the bridging to be nearly balanced. Bridging 40 is so balanced that, when it is raised to position 40a, it remains there until the cable 40b is pulled to return it to a nearly normal position. A limit stop 40d is fastened out from rail 1 to prevent bridging 40 from rotating too far downward. If runways R1 and R2 on parking device L1 are in high position and tilt down to engage runways on parking device L2, bridgings 40 will contact the runways on parking device L2. If further movement than the first contact is required, bridging 40 rotates upward, by its bearing action against runway on L2, to a position similar to 40a but not quite as far, thus it tilts and passes that particular runway. Then it automatically resumes its nearly horizontal position. It engages the next runway on parking device L2, and, if not in the required position, it tilts up and passes. Then the runway continues to the ground where bridging 40 first touches and then lifts to allow rails 1 to bear on the ground.

As a matter of precaution, wheel blocks 42 are used at both front and back of at least one rear vehicle wheel to prevent a vehicle from accidentally moving when parked. These wheel blocks 42 may be angle-irons, which can be fastened together with a chain. The chain helps the operator pull both blocks from under the wheel with less risk of a hand injury which might result from the sudden movement of the parked vehicle. The chain may have a jawed self-tightening clamp to engage the rail edge and to prevent the blocks 42 from sliding. Wheel blocks 42 may be used near the ends of rails 1 as removable stops.

Although it would be possible for an operator to have access to vehicles on the runway by means of portable ladders, such an arrangement would require two operators which would not be economically sound. Various means are available which would permit the operator to have access to the vehicles on the runways. Both sides of fulcrum member 8 have ladder rungs 8a for access to and from any runways. Posts 17 have rungs 17a for access to the runways if they are more convenient.

Walkways 43a and 43b are supported by beams 44a and 44b. These beams are connected to runway rail 1 as shown in Fig. 1. Overhead safety hand lines 45 are for the operator to hold onto when walking along the walkway to or from the vehicles. These walkways may be of very lightweight grating. If grating is used, a grating bar should be raised above the others at every foot along the cross grating to form a cleat. When the runways are tilted, walkways on the bottom runways are accessible to the operator from the ground. The operator can walk on center piece 16. The whole runway can be used as a walk when not obstructed by vehicles. The operator can step across to adjacent side or end runways. Posts 17 and fulcrum members 8 project far enough above the top runway levels to provide handholds for the operator to grip when stepping from these members onto the runways. An operator, standing on rungs 8a of fulcrum member 8, would have to step around center plate 5 to rung 1d on rail 1 for access to walkways 43a and 43b. While so doing the operator could grip hand rungs 7a on diagonals 7. Other hand rungs may be attached to structure if so desired.

Warning device 46, as shown in Fig. 3, can be connected to the fulcrum members and center plates 5 to warn the operator when a vehicle is too close to the framework. These warning devices 46 give off a ringing sound when they touch an obstruction. They would be similar to curb feelers used on vehicles to warn the operator when a vehicle is too close to a curb.

Visual devices V, shown on vehicles in Figure 3, will be described later.

Although a pair of parking devices, such as L1 and L2, would be generally required to work together, one parking device, such as L1, can be used alone if a second level, adjacent access driveway was available. This second level access driveway could have a hinged apron 47 attached from a floor or raised roadway which would allow vehicles to be bridged to the runways. Apron 47 is shown in Figs. 1, 2, and 2A. In general, this apron 47 could be one, two, or three runway heights above the ground and still be used to load the top runway. Runway R1 may be loaded from the ground or from a single elevated apron 47 only, or at two or three different elevated accesses, in addition to ground level. Bridging 40 can be used, instead of aprons 47, to bridge the gap between the runways, accessible roadways, and floors.

Wearing surfaces of rails, walkways and bridging, may be covered with abrasive material to provide a rough surface to prevent vehicles and the operator from slipping. These wearing surfaces can be painted and before drying they can be dusted with grains of abrasive material. A parking device which is to be used frequently would have a more durable abrasive coating, such as a thin layer of roughened concrete with cleats. Pieces of wire may be welded to wearing surfaces to anchor concrete.

A modification of the support for parking device L1 has fulcrum members 9a bolted to a turntable. This arrangement allows the device to be loaded in a congested area, and then be rotated to clear the congested space.

A modification of the foundation for parking device L1 has fulcrum members 9a bolted to pier or piling above a body of water, such as a stream or tidal waters. The parking device may be set high enough for the lower runway when in tilted position to clear the water, and close enough to the shore for runways to engage an apron such as 47 that would be attached to the shore, preferably at the level of the horizontal position of the lower runway, so that it and tilted top runway can use this access apron. No safety screens are used with this modification. A catch on apron 47 and a catch below it, anchored to the shore at the tilted position of the lower runway may be used for safe ramping and locking.

Figure 11:
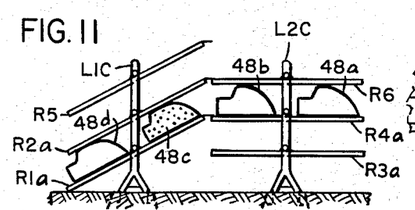
Fig. 11 shows a modification similar to Fig. 8, but with an additional tier, one position of a loading sequence being shown.
Figures 12, 13, 14, 15, 16, 18, 19, 20, 21, 22:
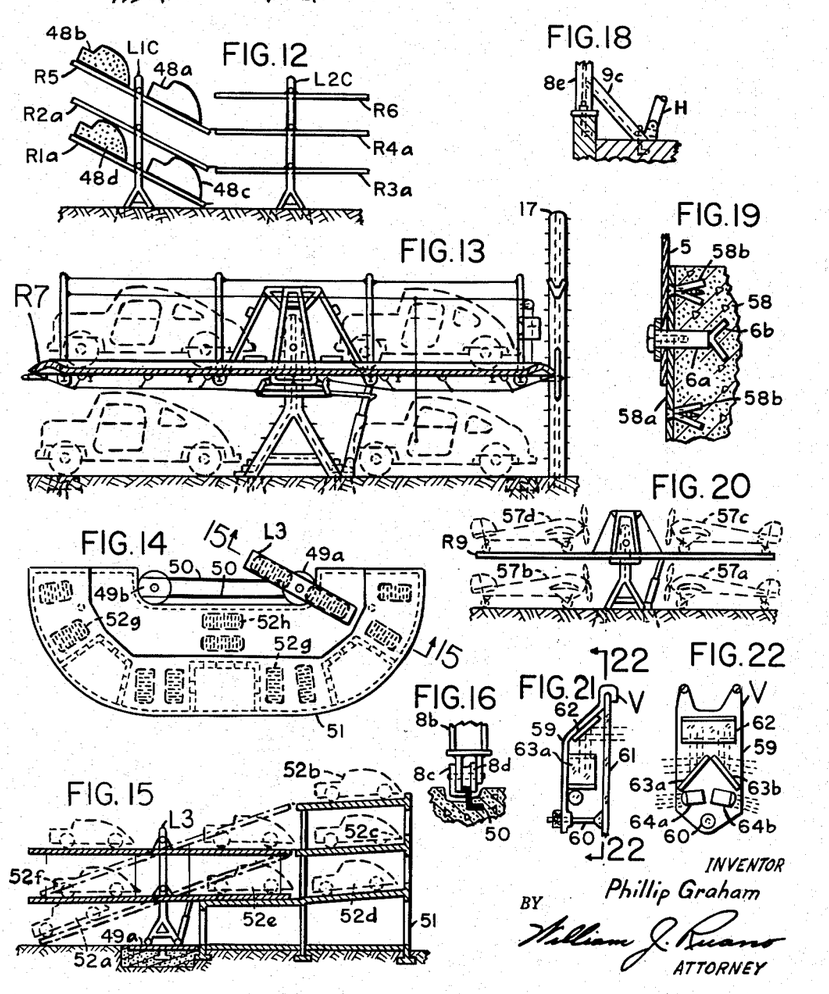
Fig. 12 shows a second position of a loading sequence of the modification shown in Fig. 11.
Fig. 13 shows a modification similar to the parking device L1, as shown in Fig. 2A, except that it has a single runway unit.
Fig. 14 is a plan view showing a modification of the parking device in relation to a building used for parking vehicles.
Fig. 15 is a sectional elevation, taken along line 15—15 of Fig. 14.
Fig. 16 is an enlarged fragmentary elevation of a fulcrum base, used on a portable track-guided parking device.
Fig. 18 is also a fragmentary elevation of a modified parking device with a modified fulcrum support.
Fig. 19 is a fragmentary sectional elevation of a modified masonry fulcrum support.
Fig. 20 is a sectional elevation of a modified parking device for small airplanes.
Fig. 21 is an elevational view of a visual device, which can be used on cars to be parked on or under the parking device runways.
Fig. 22 is a sectional elevation, taken along line 22—22 of Fig. 21.

Figs. 11 and 12 show modified vehicle parking devices L1C and L2C which are similar to parking devices L1 and L2. They differ from L1 and L2 in that each has a third runway. Runway R5 is on top of parking device L1C and runway R6, on top of parking device L2C. The runways, R1a to R4a inclusive, are similar to runways R1 to R4 inclusive, for parking devices L1 and L2. Figs. 11 and 12 show a sequence for loading runway R5. A similar sequence may be used for loading runway R6. The two sets of lower runways may be loaded the same as were runways on parking devices L1 and L2. The method used to load third runway R5 can be used to load any additional runways. There could be more than three with similar modifications. In Fig. 11, vehicles 48a and 48b are backed up runway R1a to runway R4a. Then vehicle 48c is backed to the extreme upper end of runway R1a to create a greater moment than that exerted by vehicle 48d, which is backed up to a position close to fulcrum. (The vehicles shown shaded are creating the greater moment.) Then the locking controls are released, and the great moment created by vehicle 48c rotates the runways to the position shown in Fig. 12. Then vehicles 48b and 48a are driven from runway R4a to runway R5.

Fig. 13 shows a modification similar to the parking device L1, as shown in Fig. 2A, except that it is a single runway unit. The single runway R7 is similar to runway R1. It can be set up as a single unit since it requires no adjoining similar unit to help load it. Safety devices required are, in general, the same as for parking device L1. This modification shown in Fig. 13 can be used and later converted to form a parking device L1, or L1C. This can be done by adding another tier or two of runways by adding a section of fulcrum members and linking the runways together.

In Fig. 13, post 17 is shown. It allows access to the raised runway. It may be eliminated in modifications as described for parking device L1. Bridging can be used to connect to adjoining parking devices or accessible floors or roadways. When bridging to adjoining devices is not desirable, automatic safety stops may be used near the ends of the rails 1. These stops may be of the type used on hydraulic lifts at service stations. They automatically form wheel stops when the lift rises above the ground. A weighted roller kicks over the stopping piece and locks it into position until the hydraulic lift is lowered to the ground. When the roller touches the ground, it moves along the ground, unlocks the stop and flattens it to the rail. This stop device may be used on these runways to provide maximum safety.

Figs. 14 and 15 show a parking device L3, which is a modification of the parking device L1, in relation to a building used for parking vehicles. The fulcrum A frames are supported on wheels so they can be moved along a track, formed by rails 50, and onto turntables 49a or 49b. Hence the parking device can be used anywhere along this stretch to ramp vehicles to higher elevations on a building, and to store vehicles on the parking device. The turntables themselves would be anchored to the ground surface, and the parking device would be held to the rails. This parking device would require wheel blocking or other brakes to prevent its moving along rails 50 when a vehicle is being ramped onto it.

The building 51, shown in Figs. 14 and 15, may be a commercial building. The parking, in general, would likely be from the rear, and the front of the building would face the main street. As can be seen in Fig. 15, the loaded runways on parking device L3 are in a horizontal position. Dot-dash outlines show the tilted positions of runways to allow ramping vehicles onto building 51. A vehicle in position 52a, on the tilted lower runway, could be backed up runway to vehicle position 52c, on building 51. Then the runways can be tilted to a horizontal position by changing the moment, and a vehicle can be driven out from position 52c to the remote end of the top runway, thus creating a moment which causes tilting of the runways. The vehicle can then be backed up the runway into position 52b on top of building 51. When desirable, vehicle position 52c can be used only for shifting vehicles to or from the higher levels. To park a vehicle in position 52d, a vehicle is backed up the tilted lower runway to the extreme end to cause tilting of the runways to a horizontal position. A vehicle is thus tilted to the position 52e, from which it is backed into position 52d. A vehicle when driven from position 52e or 52d to position 52f, will create a moment to tilt the runways. Removing vehicles from building 51 and parking device L3 is the reversal of loading operations. Other vehicle positions, such as 52g, which are similar to positions 52b, 52c, and 52d, would be filled. When parking device L3 is moved to another location alongside the building 51, vehicles may be driven out from such positions as 52d to others such as 52h. Then the positions, such as 52d, may be filled with additional vehicles. Thus this parking device L3 would be a portable ramp in addition to being used to park vehicles on both runways. The rotating of the turntables and movement along track rails 50 may be either manually operated, or powered with a suitable means.

An enlarged fragment of the fulcrum base member 8b is shown in Fig. 16. It has a flanged wheel 8d which engages Z bar type rails 50. When unequal loading conditions prevail, an arm 8c from the wheel pin plate restrains the fulcrum from lifting. Arm 8c would have an adjustable device to press it against rail 50 and act as a brake, or the wheels could be blocked.

The first floor of building 51 is shown clear of parked cars. Vehicles could be parked on this first floor area, or it could be used as floor space for merchandise, etc. By using parking device L3 for raising and parking cars high or low on a building, patrons can drive, or have their vehicles driven, up this parking device. Thus they can shop or work on the higher or lower floors, without climbing stairs or using an elevator. Hence retail merchandising or other commercial or dwelling interests could use the space which is adjacent to the vehicles without inconveniencing the public which patronizes them. In business locations people do not object as much to walking downstairs and then up as they do to walking upstairs and then down. Thus patrons would not avoid such upper floors of a building such as 51.

Modified parking devices with a single runway similar to that shown in Fig. 13, and parking devices with triple or more runways, similar to L1C, are mounted and used similar to the arrangement for parking device L3. Parking devices with one or more runways, with powered turntable, may also be used for parking or for effective displaying of vehicles, such as in showrooms. The turntable can move continuously about a circular path. Runways could be in a horizontal or tilted plane while being rotated.

Figure 17:
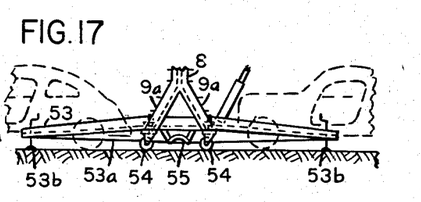
Fig. 17 is a fragmentary elevation of a portable parking device similar to Fig. 2A, but having a fulcrum support which is not anchored.

Fig. 17 is a fragmentary elevation of a portable parking device similar to Fig. 2A, but has a fulcrum support which is not anchored. It has outriggers 53 to prevent the device from upsetting, because the fulcrum is not tied down as it is for parking device L1. Outriggers 53 are connected to fulcrum A frame members 9a. Rod 53a is arranged to give additional strength to the outrigger. Jacks 53b, which have crank handles, are included. The lower part of the shaft of jack 53b is threaded to suit a nut on outrigger 53, and a flat surface on the end of jack 53b engages the ground. Therefore, both ends of outrigger 53 engage the ground with the help of these jacks 53b. Thus they give a firm support for the parking device and prevent it from moving after it has been set up for use. Swiveled wheels 54 are connected to fulcrum base 9a. Strut 55 connects outriggers 53 and thus ties together the bottoms of the fulcrum A frames. For stiffness, strut 55 may be a curved section, such as a half round. It should be located as close to the ground as possible in order to allow vehicles to be driven over the top of it. Swiveled wheels 54 are used to allow this portable type parking device to be moved to a desired position. The parking device could be pulled in to a parking area and moved around to a suitable site by a motorized vehicle. In general, it would not be moved much on these wheels, so motor power on the device has not been shown. The present parking device does not require anchors. It could have blocking or pedestal replacing the wheels. Portable, in a broad sense, refers to a parking device that can be set up or dismantled without disturbing the ground or floor surface on which it rests. If it is to be moved and dismantled and shipped frequently, it should be made largely of bolted construction.

Fig. 18 is a fragmentary elevation of a modified parking device with a modified fulcrum support. This parking device is similar to parking device L1, which is shown in Fig. 2A. Fulcrum wide flange section 8e has a base plate which engages the anchor bolts that are imbedded in a masonry wall. Diagonal brace 9c, which is similar to fulcrum member 9a, has a base which engages anchor bolts imbedded in concrete. This arrangement could be used on the roof of a building and other such places where one end of the runways cantilevers over the side of the building. It could be used on a wall which is along a sloping shoreline or hillside, with the runways cantilevering over the water or hillside. With such a modification, safety screen on the cantilevered left end would be omitted. This modification could be used without using any space for parking vehicles on the ground surface. One end would be cantilevered over the water or hillside and the other raised above a roadway or other ground surface that was not continuously occupied. This modification could have the runways tilted to the highest tilted position, to clear large vehicles on roadway, rather than to have it kept in horizontal loaded position.

Fig. 19 is a fragmentary sectional elevation of modified fulcrum support. Fulcrum pin 6a, which is similar to pin 6, is supported by masonry building member 58, which acts as a fulcrum member. Wearing plate 58a is attached to building member 58. Pin plate 5 is supported by pin 6a and bears or rubs against plate 58a. Expansion bolts 58b, which have counter-sunk heads, fasten plate 58a to building member 58. Pin 6a can be fastened to plate 58a by welding or other means. Anchor 6b will hold pin 6a to the concrete. A machine screw and washer, fastened on pin 6a, prevents plate 5 from disengaging.

Fig. 20 is a sectional elevation of a modified parking device for small airplanes. It is similar to that shown in Fig. 13 except that it can be used for small aircraft. Runway R9 is similar to runway R7. Since planes have three wheels, runway center piece 10 is used to support the small rear wheel, thus acting as a third rail. Four planes, 57a, 57b, 57c, and 57d, are shown; two are on runway R9. They are ramped into position by tilting runway R9. Planes could be ramped into runway positions with their own power, or pushed on by another vehicle. A pulley near the center of runway, may guide a cable from a plane to a winch below runway, to pull planes onto runway. The spreading wings of the plane would not clear high vertical members along the runway sides. Therefore, control cable 14 would need to be relocated low, just above the runway, and any safety support, such as hand rail 45, would also need to be lowered to clear the wings. Otherwise, it is similar to the device shown in Fig. 13. Planes are loaded from both ends, and the planes' wings will not pass between fulcrum members 8, unless the fulcrum members are spread wide apart.

Fig. 21 is an elevational view of a visual device V. It can be hooked onto, and hung outside of the top of a vehicle door window which is slightly lowered. It allows the operator of the vehicle to see both the front and rear along the side of vehicle so he can steer the car safely along a runway without colliding with vertical members of the parking device, such as the fulcrum. This device can be used on cars at all times as it enables the operator to view both front and rear along the side of the car from his normal driving position. Devices, such as this, could be used on both sides of a car for visibility in parking or passing another vehicle. Also, they could be used to guide a car close to a road shoulder or in or out of ruts.

Visual device V consists of frame 59 with an adjustable arm 60, which fastens to glass 61 in the vehicle door by means of a vacuum cup or other contacting surface. The arm 60 engages the vehicle body below the glass. The vacuum cup prevents visual device V from tilting in its relationship with the vehicle. The upper end of frame 59 has two rubber covered hooks to catch either the top of glass 61 or the car drip molding. If visual device V is to be a permanent fixture it can be modified to fasten to the vehicle in such a manner that the window can be closed. The glass 61 in vehicle door can be almost closed to protect the interior of the vehicle in rainy weather. From the driver's position in the vehicle, he can, by a system of mirrors 62, 63a and 63b, see the reflection of the front and rear of the side of the vehicle in relation to possible obstructions. The window, with visual device V attached, can be raised or lowered to suit the operator's viewing position. He can also lean to a viewing position. The operator can, by looking sideways from his normal driving position, see, through glass 61, the reflections in mirrors 62, which are reflected from mirrors 63a and 63b. The mirrors 63a and 63b are so arranged that they reflect the desired views. Electric lights 64a and 64b are similar to flashlights. They can be turned on when parking or backing the vehicle if darkness causes poor visibility. Lights 64a and 64b illuminate the area being viewed through visual device V. Permanent fixed type visual devices such as V can be wired to the car battery. Thus the operator can safely park the car in close spaces, without leaning out of a window or door to obtain good visibility.

Mirrors and illuminating lights can be mounted on parking devices to aid in guiding vehicles. Parking devices, such as L3, which would likely be used frequently, could have mirrors and lights to aid the driver, in place of visual devices V.

Thus I have provided an efficient and economical parking device which allows storing and parking of a large number of vehicles in a relatively small space; furthermore I have provided a parking device which is similar to a teeter-totter with one, two, three or more runways, so as to enable parking or storing a selective number of tiers of cars; also I have provided a parking device which is safe to operate and which is relatively foolproof, that is, it provides necessary safety features for protecting both the operator and the vehicles against injury or damage; also I have provided a parking device which is rotatable about a vertical axis so as to be useful as a display device for autommobiles arranged in tiers.

While I have illustrated and described several specific embodiments of my invention, it will be understood that these are by way of illustration only, and that various changes and modifications may be made within the contemplation of my invention and within the scope of the following claims

I claim:

1. A vehicle parking device comprising a runway, supporting means for pivotally supporting said runway substantially centrally thereof and being of a height above a floor exceeding that of an automobile, said runway having a length in excess of that of two average automobiles, whereby four cars can be stored two on and two below said runway, said runway being pivoted so that either end may touch the floor, and means for selectively locking said runway in either a tilted or horizontal position, said locking means being manually and selectively operable at different points along said trackway.

2. A vehicle parking device comprising a pair of tiered runways spaced by a distance greater than the height of an automobile, and pivotally secured together, a horse-like frame having separate pivots at different heights, each pivotally supporting one of said runways substantially centrally thereof and the lower runway being of a height sufficiently great so that cars may be parked under said lower runway, the lengths of said runways being in excess of twice the length of an automobile whereby four cars may be supported by said runways, two on each, and two underneath the lower runway.

3. A parking device assembly comprising two parking devices as recited in claim 2 in end to end relationship whereby cars from the runways of one device can be wheeled onto adjoining runways of the adjacent device after one device has been tilted relative to the other.

4. A vehicle parking device as recited in claim 2 together with means for rotating said trackway about a vertical axis extending through said frame.

5. A vehicle parking device as recited in claim 2 together with turntable means for rotatably mounting said runways about a vertical axis extending through said frame.

6. A vehicle parking device as recited in claim 2 together with turntable means for rotatably supporting said trackway so as to permit rotation about a vertical axis, and track means on said supporting floor for guiding the movement of said device on said floor.

7. A vehicle parking device as recited in claim 2 together with track means on said supporting floor for guiding the movement of said device on said floor.

8. A parking device comprising at least three tiered runways spaced apart by a distance greater than the height of an automobile, means for pivotally interconnecting said runways to form a rigid unit, and separate pivot means for pivotally supporting said runways at different levels whereby an end of the lowermost runway may be tilted sufficiently to align with a loading level for automobiles, each half of each runway measured from the pivot means being greater than the length of a car.

9. A vehicle parking assembly comprising a plurality of devices such as recited in claim 8 in end-to-end relationship so that cars from one device can be driven onto an adjoining device upon tilting of the devices so that certain runways are in juxtaposition.

10. A car parking device comprising a pair of tiered runways, a pair of fulcrums each supporting one of said runways substantially centrally intermediate its height, each runway being of a length sufficiently great so as to accommodate two cars, one on each side of the fulcrum, a vertical support having means for selectively locking to the support the end of one of said runways in a selected tilted position of the runway, and a second parking device identical to the first parking device disposed on the other side of said vertical support, in end-to-end relationship whereby cars can be driven from the runway of one device to that of an adjoining device when their ends are locked together in abutting relationship.

11. A vehicle parking device comprising a trackway, a horse-like frame pivotally supporting said trackway substantially at the center thereof for tilting movement such that either end can be moved to the level of the frame supporting floor, the distance between the center and end of said trackway being greater than the length of an automobile so as to permit storage of two automobiles on said trackway and movement of either toward or away from the pivotal supporting frame for selectively counteracting their moments, and a retarding means connected to said trackway to retard tilting movement and including valve means, and a safety screen extending underneath said trackway which, when tilting into an obstruction such as a car underneath will operate said valve means to effect stopping of the tilting movement.

12. A vehicle parking device comprising a trackway, a horse-like frame pivotally supporting said trackway substantially at the center thereof for tilting movement such that either end can be moved to the level of the frame supporting floor, the distance between the center and end of said trackway being greater than the length of an automobile so as to permit storage of two automobiles on said trackway and movement of either toward or away from the pivotal supporting frame for selectively counteracting their moments, and a safety means extending underneath said trackway throughout substantially the entire length thereof, means for controlling and retarding the tilting movement of said trackway and controlled by said safety means so that when said safety means detects an obstruction, such as a car underneath the trackway, the movement of said trackway will be arrested.

References Cited in the file of this patent

UNITED STATES PATENTS

| Number | Name | Date |
|---|---|---|
| 1,987,376 | Stearns | Jan. 8, 1935 |

FOREIGN PATENTS

| Number | Country | Date |
|---|---|---|
| 299,508 | Great Britain | Oct. 29, 1928 |